June 20, 1961

R. POUIT 2,988,884

IMPROVEMENTS IN GAS TURBINE POWER PLANTS

Filed Sept. 15, 1959

Inventor
Robert Pouit
By
Bailey, Stephens & Huettig
Attorneys

June 20, 1961  R. POUIT  2,988,884
IMPROVEMENTS IN GAS TURBINE POWER PLANTS
Filed Sept. 15, 1959  3 Sheets-Sheet 3

Fig. 4.

INVENTOR
Robert Pouit
BY
Bailey, Stephens & Huettig
ATTORNEYS

United States Patent Office 2,988,884
Patented June 20, 1961

2,988,884
IMPROVEMENTS IN GAS TURBINE POWER PLANTS
Robert Pouit, 3 Rue Auguste Mayet, Asnieres, France
Filed Sept. 15, 1959, Ser. No. 840,170
Claims priority, application France Sept. 23, 1958
4 Claims. (Cl. 60—39.17)

The present invention relates to thermal installations comprising at least one high-pressure turbo-compressor set and at least one working turbine which is mechanically independent from the above-mentioned set; and in such installations, the present invention is more especially concerned, although not exclusively, with a particular case in which its application appears to be of the greatest value, namely, those installations in which the receiving portion is constituted by a driving turbine intended to ensure the propulsion of a vehicle such as, for example, an automobile vehicle.

The invention has for its principal object to adapt the above-mentioned installations so that they meet more effectively than up to the present time the various conditions required in practice, particularly as concerns the influence of variations of load on the thermodynamic efficiency of the installation.

The invention mainly consists in arranging the installations of the type in question, in such manner that the regulation of the useful power, below the normal power, is obtained by transferring into the gas which is compressed by the high-pressure compressor a variable and adjustable portion of the useful heat (that is to say, which can be converted to mechanical energy) contained in the exhaust gases of the high-pressure turbine the said compressed gas having previously been able to benefit if necessary from the addition of a portion of the heat of the exhaust gases of the turbine at the lowest pressure (heat that cannot be converted to energy) in a recovery tank which can be of the usual type.

The present invention will in any case be understood by means of the additional description which follows below, together with the accompanying drawings, it being understood that both the description and drawings are primarily given by way of example and not in any sense by way of implied limitation.

FIG. 1 of these drawings is a diagram showing an installation with turbo-compressor set and a working turbine constructed in accordance with the invention.

Figure 1:
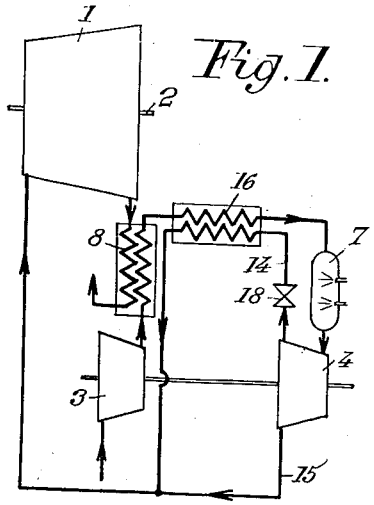

Finally, FIG. 4 shows a further form of embodiment of an installation with high-pressure turbo-compressor set and a working turbine, constructed in accordance with the invention.

In accordance with the present invention and more especially in accordance with its methods of application, as well as those forms of embodiment of its various parts to which it would appear necessary to give preference with the intention, for example, of constructing an installation with driving turbine for a vehicle, supplied with gas by at least one high-pressure turbo-compressor set, the method of operation is carried out as follows or in like manner, taking into account the considerations outlined below.

Thermal recuperators are already known which exchange heat between the exhaust gases of a gas turbine installation in open circuit and the compressed air derived from a high-pressure turbo-compressor set of this installation, and thus enable at least a part of the heat which cannot be converted to energy and which is contained in the exhaust gases, to be reintroduced in the high-pressure compressed air, these exhaust gases being completely expanded down to the ambient pressure.

It should be observed however, that on the one hand, for the overall sizes permissible, the effectiveness of recuperators of this type is limited by the relatively small difference of temperature between the expanded gases and the compressed air and that on the other hand, insofar as more especially concerns the recuperators for exchanging heat by means of moving elements, the large difference of pressure between the compressed air and the expanded gases dictates the need for complicated and costly arrangements for ensuring fluid-tightness.

These reasons, to which should be added in particular the slowness of alteration of the thermal conditions of recuperators of this type, do not make it feasible to employ the variation of the heat recycled by the said recuperators as a means of regulation of the power of the installation.

Moreover, the margin in which a variation of this kind is produced is not sufficient to enable the power of the installation to be adjusted over a wide range.

On the contrary, in accordance with the present invention, these disadvantages are avoided because the recycling of heat which can still be converted to energy at a high level of pressure by the adjustable transfer of the heat contained in the exhaust gases of a high pressure turbine into the high-pressure compressed air makes it possible, by taking advantage of a large difference of temperature and of a small difference of pressure, to ensure a rapid and extensive variation of the useful power, in a totally effective manner, and in an exchanger of small size and weight.

This arrangement also makes it possible to ensure the compatibility of the operational factors (rate of flow, pressure and temperature), so as to keep to an approximately constant value the ratios of similitude which ensure the almost constant individual efficiencies of the different machines of the installation and so as to maintain at the same time a constant value of the working efficiency of the heat cycle as a result of the constant value of the maximum temperature over a wide range of variation of power.

It follows from this that the present invention makes it possible to ensure that the specific consumption of installations having open-circuit gas turbines is kept at a substantially constant value over a wide range of variation of power.

A particularly simple installation of this type is shown in FIG. 1 and comprises in a manner which is known per se, in addition to other elements: on the one hand, a driving turbine 1, the shaft 2 of which is coupled in rotation, through the intermediary of transmission devices which are not shown, to the units to be driven, the said driving turbine being supplied by the hot gases derived from the turbine of a turbo-compressor set which will be described below; and on the other hand, a turbo-compressor set composed of a compressor 3 which sucks in atmospheric air, driven by a turbine 4 which is supplied with hot gases under pressure by the air derived from the compressor 3, after the said air has been heated by passing through a combustion chamber 7.

This being the case, a recuperator 8 is preferably arranged in a manner which is also known per se, between the delivery end of the compressor 3 and the combustion chamber 7, the said recuperator 8 enabling the temperature of the compressed air derived from the said compressor to be increased preferably by recovering a part of the residual heat of the exhaust gases which pass out of the driving turbine 1 after expansion.

If it were considered sufficient to proceed as explained above, only one open-circuit gas turbine of usual type would be available for use, the reduction of the power of the said gas turbine on the shaft 2 of the turbine 1 being obtained by quantitative reduction of the fuel injected into the chamber 7, thereby leading to a general reduction of the temperatures which has, as its final result, a considerable reduction of efficiency when working at low power.

In accordance with the present invention and in order to overcome this disadvantage, working at reduced power is obtained concurrently by means of the quantitative reduction of the fuel introduced in the chamber 7 and by heating the compressed air which passes out of the recuperator 8 at the expense of the exhaust gases of the high pressure turbine 4, thus re-cycling at high pressure a part of the heat of the driving gases which, instead of supplying mechanical energy in the driving turbine 1, raise the temperature of the compressed air introduced into the combustion chamber 7.

In this manner, the driving power is reduced without appreciable variation of the temperature at the admission of the high-pressure turbine 4, in spite of the fact that the quantity of fuel consumed has been reduced.

For this purpose, there is provided, for example, at the exhaust end of the turbine 4, a diversion conduit 14, the delivery of which is controlled by a regulating unit 18, a heat exchanger 16 being interposed in the said diversion conduit 14; compressed air previously heated in the recuperator 8 being caused to pass through the said heat exchanger 16.

It will be understood that the driving power will be progressively reduced as the temperature of the gases at the admission of the driving turbine 1 is correspondingly lowered by the operation of the regulating unit 18 which increases the quantity of driving gases diverted into the conduit 14.

In other words, for the same rate of flow and the same pressure, the power obtained on the shaft 2 of the driving turbine 1 becomes less as the temperature at the admission of the said turbine 1 is lower, the reduction of the driving power being progressively greater as an increasing part of the quantity of driving gases is diverted into the diversion conduit 14, and sent to the exchanger 16.

The effectiveness of the system which has just been described and which is solely due to the lowering of the temperature of the gases at the admission of the low-pressure turbine makes it quite feasible to substantially maintain the efficiency of the thermo-dynamic cycle, but only permits substantial reductions of power, however, when combined with a correlative reduction of the flow and pressure characteristics, without resulting in an appreciable reduction of the operational efficiency of the different machines of the installation, the pressure-flow-temperature characteristics of which are related to each other by the known laws of similitude and continuity.

Figure 2:
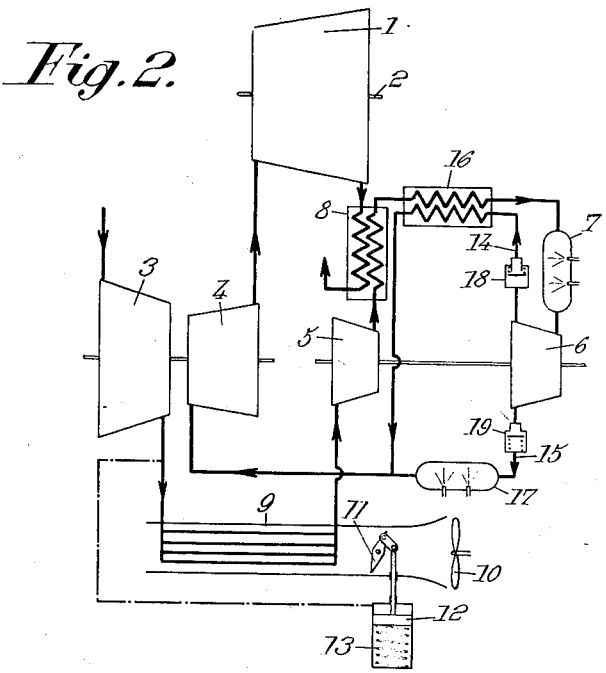
FIG. 2 shows under the same conditions, an installation with two turbo-compressor sets and with a working turbine, also constructed in accordance with the invention.

The case of open-circuit gas turbine installations will now be examined with reference to FIG. 2, the said installations comprising, in addition to the driving turbine, at least two turbo-compressor sets in series and mechanically independent from each other, namely one high-pressure set comprising a compressor 5 driven by a turbine 6 and, on the other hand, one medium-pressure set comprising a compressor 3 driven by a turbine 4, the medium-pressure turbine 4 exhausting into the low-pressure driving turbine 1 and the low-pressure compressor 3 delivering into the high-pressure compressor 5, after intermediate cooling of the low-pressure compressed air between two phases of compression, in an adjustable cooler 9.

The installation is then completed by two diversion conduits in parallel 14 and 15, located between the exhaust of the high-pressure turbine 6 and the admission in the medium-pressure turbine 4 and the exchanger 16 is then disposed in the diversion conduit 14, a superheating device constituted by an additional chamber 17 being provided in the diversion conduit 15.

With regard to the control devices which enable one or the other of the paths 14 and 15 to be put into service, they can be constituted by units which can be regulated at will such as for example gates or shutters 18 and 19 of the automatic clapper-valve type.

In accordance with the present invention, in the case of an installation of this kind with two stages of compression, the speed and temperature characteristics of the high-pressure turbo-compressor set 5—6 are kept constant by adjusting on the one hand, the intermediate cooling in the cooler 9 so as to keep the admission of air to the compressor 5 at a constant temperature and on the other hand, at the same time, by regulating the quantity of fuel which is burnt in the chamber 7, so as to ensure that both the temperature at the admission of the turbine 6 and the speed of the turbo-compressor set 5—6 remain constant.

Under these conditions, on the one hand, the power and efficiency of each machine of the high-pressure turbo-compressor set remain invariable when the output changes and on the other hand, the condition of continuity is satisfied and the flow varies proportionately to the pressure of delivery of the low-pressure compressor 3.

A certain variation of the efficiency proper of the said low-pressure compressor 3 corresponds to the pressure-flow characteristic of operation of the said compressor 3 when the delivery pressure of the compressor 3 varies, the said pressure-flow characteristic being automatically imposed by the conditions of constancy of the characteristics of the high-pressure turbo-compressor set. This usually results in a slight decrease in efficiency when the pressure in question decreases (the efficiency drops, for example, from the value of 0.84 at full load to the value of 0.80 at half-load).

In accordance with the present invention, the control of the means utilized to ensure the regulation of power of an installation of the type indicated is ensured by one of the operational factors of the installation such as for example the pressure at one or a number of points in the installation.

Figure 3:
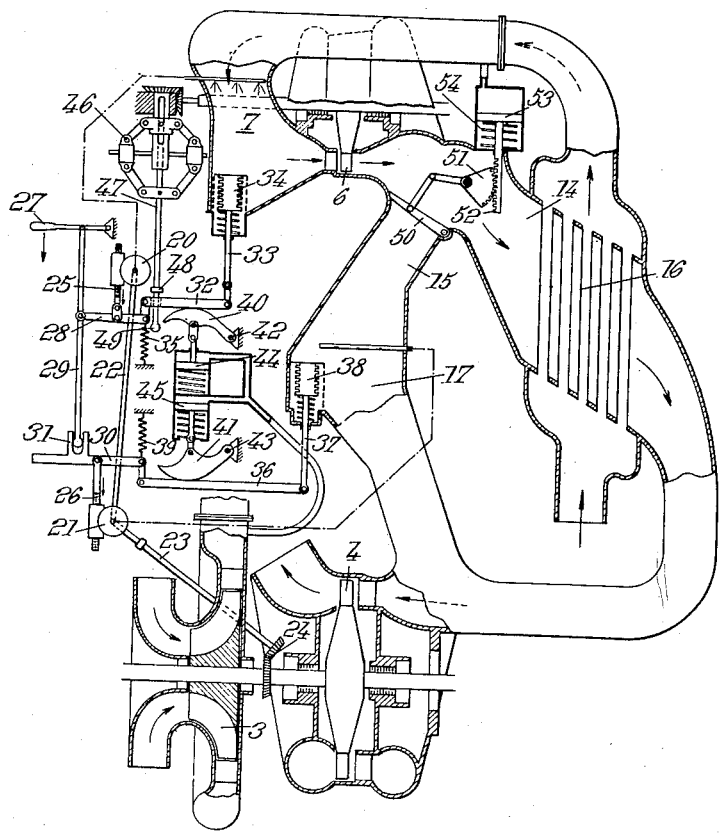
FIG. 3 illustrates in greater detail, a constructional form of embodiment of an installation, the principle of which is in conformity with the diagram of FIG. 2.

For this purpose and by way of example, there can be employed a form of embodiment which is illustrated in FIG. 3, in which the same reference numbers have been adopted as in FIG. 2 when referring to the same members or units.

The main combustion chamber 7 and the additional combustion chamber 17 are respectively supplied with fuel by two pumps 20 and 21 driven mechanically by the low-pressure turbo-compressor set, for example through the intermediary of shafts 22 and 23 and of a set of gears 24, the said pumps being adjusted in such manner that the quantities of fuel delivered are substantially proportional to the flow of air passing through the low-pressure compressor 3.

The pumps 20 and 21 are controlled from the quantitative point of view by means of regulating units such as for example rack bars 25 and 26 which are both coupled to the general power-control unit represented by a lever 27.

The lever 27 is arranged so as to come into engagement first with the rack bar 25 of the pump 20 and only subsequently with the rack bar 26 of the pump 21; and it is for this reason, for example, as assumed below, that:

The rack bar 25 is coupled to the central part of a connecting arm 28, one of the extremities of which is pivotally mounted on a control rod 29 operated by the lever 27; and The rack bar 26 is coupled to the central portion of another connecting arm 30, one of the extremities of which is provided with a slide 31 intended to guide the extremity of the control rod 29, the said extremity then beginning to engage the said connecting arm 30 by means of an abutment when once the lever 27 has already travelled a certain distance during which the rack bar 25 was alone actuated (the movement of the lever 27 in the direction of the arrow increases the flow of fuel delivered by the pump or pumps which are operated by the said lever).

The system of operation of the pumps 20 and 21 under the control of certain operational factors of the installation is completed in the manner described hereunder.

First of all, as far as the pump 20 is concerned, the free extremity of the connecting arm 28 is coupled, for example through the intermediary of a crank arm 32 and of a rod 33, to a thermostat 34 placed towards the outlet of the main combustion chamber 7 and arranged in such manner as to permit the rack bar 25, in the event of an increase in the temperature existing in the said main combustion chamber, to move in opposition to the action of a restoring spring 35, in the direction which corresponds to a reduction of the flow of fuel delivered by the above-mentioned pump 20.

Secondly, as far as the pump 21 is concerned, the free extremity of the connecting arm 30 is coupled, for example through the intermediary of a crank rod 36, and of a rod 37, to a thermostat 38 disposed towards the outlet of the additional combustion chamber 17 and arranged in such manner as to permit the rack bar 26, in the event of an increase of temperature in the above-mentioned combustion chamber, to move under the action of a restoring spring 39 in the direction corresponding to a reduction of the flow of fuel delivered by the above-mentioned pump 21.

In addition, the pumps 20 and 21 can then be effectively controlled by the delivery pressure of the low-pressure compressor 3, so that when the said pressure increases, the rates of flow of the above-mentioned pumps also increase, and vice versa.

For this purpose and by way of example, the crank rods 32 and 36 can be applied against profiled cams 40 and 41 which are pivotally mounted respectively on fixed shafts 42 and 43 and are driven with respect to their pivotal movement, by two pistons 44 and 45, one face of which is subjected to the regulating pressure, while the other face is subjected to the action of a restoring spring.

The control system for the pump 20 which delivers fuel to the main combustion chamber 7 is effectively completed by providing a centrifugal regulator 46 driven in rotation by the high-pressure turbo-compressor set, the said regulator being arranged in such manner as to come into operation in one direction or in the other respectively in the case of limiting speeds above or below the speed at which the said turbo-compressor set is adjusted, so that when the speed in question falls below the lower limiting value which has previously been determined, the delivery of the pump 20 increases, and when on the other hand, the said speed exceeds the higher limiting value previously determined, the delivery of the said pump decreases.

For this purpose and by way of example, the rod 47 of the regulator 46 can be caused to pass through the crank rod 32, and two projections 48 and 49 can be formed on the said rod 47 and arranged in such a position as to engage the said crank-rod in the case of the limiting values selected for the speed of the high-pressure turbo-compressor set.

Finally, as regards the means to be provided for conveying at least a part of the gases derived from the high-pressure turbine 6, according to whether the delivery pressure of the high-pressure compressor is higher or lower than a pre-determined value, either along the channel 15 into the additional combustion chamber 17, or along the channel 14 into the exchanger 16; the said means can be constituted for example by providing at the outlet of the high-pressure turbine 6 a forked section, the branches of which respectively terminate in the above-mentioned additional combustion chamber 17 and in the said exchanger 16, this diversion being controlled by means of a shutter 50 driven for example through the intermediary of a toothed segment 51 and of a rack bar 52, by means of a piston 53, one face of which is subjected to the delivery pressure of the high-pressure compressor and the other face of said piston being subjected to the action of a restoring spring 54.

The spring 54 is calibrated in such manner that when the delivery pressure passes beyond the pre-determined critical value, the shutter 50 closes the channel 14 and opens the channel 15 and conversely, when the delivery pressure is lower than the above-mentioned limiting pressure, the shutter 50 opens, at least partially, the channel 14, a part of the gases derived from the turbine 6 being still able to pass without hindrance through the additional combustion chamber 17 into which the pump 21 then no longer delivers fuel.

An installation of this type then operates in the following manner:

It will be assumed that the installation is running at low power. If, when starting from this condition, the load on the driving turbine increases, the operator should, in order to meet this increased power demand, move the control lever 27 in the direction which corresponds to an increase in the flow of fuel delivered by the pump 20 supplying the main combustion chamber 7 (direction of the arrow). This results in an acceleration of the high-pressure turbine 6 and of the low-pressure turbine 4 and subsequently, an increase in the delivery pressure of the high-pressure and low-pressure compressors. When once the control lever 27 is stationary in the new position selected for it, the regulation of the quantity of fuel delivered into the main combustion chamber is carried out by means of the combined action on the cam 40 of the delivery pressure of the low-pressure compressor 3 exerted on the piston 44 on the one hand and, on the other hand, of the combustion temperature acting on the thermostat 34. If the high-pressure turbo-compressor tends to race, the projection 49 which is controlled by the regulator 46 comes into action so as to reduce the quantity of fuel injected into the chamber 7 and, conversely, if the speed of the said set falls below a value which is slightly less than the speed indicated by means of the control lever 27, the projection 48 comes into action to increase the rate of injection of fuel. If the demand for increase of power of the driving turbine 1 is such that the necessary movement of the lever 27 is sufficient to enable the extremity of the rod 29 to engage the connecting arm 30, the pump 21 delivers fuel into the additional combustion chamber 17 which is supplied with hot gases derived from the high-pressure turbine 6 owing to the fact that the delivery pressure of the high-pressure compressor, while increasing, has then passed beyond the value starting from which the channel 15 begins to be opened by the shutter 50. This supplementary combustion creates an increase in the power of the installation without thereby modifying the characteristics of the high-pressure turbo-compressor set and the subsequent efficiency of the said installation.

In the case described above, of installations comprising at least two turbo-compressor sets mounted in series, the means intended to maintain the characteristics of the speed and the temperature of the high-compressor set at a constant value, and controlled by at least one factor of operation of the installation produces in the case of the low-pressure compressor a certain pressure-flow characteristic of operation imposed by the continuity factor. This generally results in a slight variation of efficiency of the said compressor, but this variation in fact has a practically negligible effect on the efficiency of the high-pressure turbine.

If, on the other hand, the installation only comprises a single turbo-compressor set, the conditions of compatibility and continuity no longer make it feasible, in order to vary the power over a wide range of adjustment (by simultaneously causing the flow and the pressure to vary), to keep either the temperature characteristics at the admission of the high-pressure turbine, or above all the speed of the single turbo-compressor, at strictly constant values; it follows from this that, insofar as the pressure-flow characteristic of operation of the single compressor is concerned, there occur substantial variations in operational efficiency as well as "hunting" effects which usually appear at low rates of flow.

In order to overcome this disadvantage, and in accordance with a particular arrangement of the present invention, the means which enable the admission temperature of the two turbines to be varied independently (injection of fuel in regulated quantities and variation of the quantity of heat extracted from the exhaust gases of the high-pressure turbine and transferred into the compressed air) are combined with independent means for the regulation of the compressor, which serve the purpose of adapting the delivery pressure of the said compressor to the variations of flow with a view to satisfying the conditions of compatibility with the operational factors of the installation and particularly according to the variation of temperature at the admission of the low-pressure turbine which, in accordance with the present invention, constitutes the determining factor of the variation of power.

These independent means of regulating the compressor can be arranged in such manner as to cause the rotary flow of the flux sucked in by the said compressor to be varied.

Different means can then be co-ordinated by causing them to be controlled by at least one of the operational factors of the installation.

In this manner, for example, the pressure at the delivery of the compressor can be made to control on the one hand, the supply of fuel as well as the proportion of the heat which is recycled between the exhaust of the high-pressure turbine and the admission of the low-pressure turbine and on the other hand, the rotary circulation of the air flux sucked in by the compressor.

A description now follows below with reference to FIG. 4, relating to a particular form of embodiment of an installation of this type comprising a single turbo-compressor which is adapted to operate at practically constant efficiency over a wide range of variation of power, the said installation being intended, for example, to ensure the propulsion of a vehicle.

In FIG. 4, the same reference numbers have been adopted as in the previous figures when referring to the same elements.

This installation is made to comprise on the one hand, a driving turbine 1, the shaft 2 of which is coupled, if necessary, through the intermediary of transmission devices which have not been shown, to the members to be driven and, on the other hand, a turbo-compressor set comprising at least one turbine 4, the shaft 114 of which drives the rotor 115 of a compressor 3, for example of the centrifugal type.

The air compressed by the compressor 3 is conveyed through a conduit 70 towards a combustion chamber 80, in which the fuel injected by injectors 90 is burnt, the said injectors being in turn fed by a pump 100 driven by the shaft 114 of the turbo-compressor, for example through the intermediary of a transmission 111.

The gases which are enriched by the products of combustion are conveyed from the combustion chamber 80 to the admission 112 of the turbine 4, from which they are conveyed, after a first expansion in the said turbine 4, towards the driving turbine 1 so as to complete their expansion in the driving turbine 1 to a pressure in the vicinity of the external pressure of the air admitted to the compressor 3.

This installation is then completed,

On the one hand by a heat recuperator 8, preferably of the type which exchanges heat by means of thin rotating elements (not shown) in which the exhaust gases from the low-pressure turbine 1 are made to circulate, this device being interposed in the compressed-air circuit between the delivery of the compressor 3 and the combustion chamber 80; and, On the other hand, by a heat exchanger 16, designed to cool at least a part of the gases which circulate between the high-pressure turbine 4 and low-pressure turbine 1, so as to re-introduce the heat extracted from the hot gases in the compressed air which was already previously heated in the recuperator 8, a two-way gate-valve 116 serving to divert at least a portion, even in fact the entire quantity of compressed air in the said heat exchanger 16.

Finally, at the admission of the compressor 3, a device is usefully provided for the purpose of imparting to the air flux sucked in by the compressor a rotary speed in the same direction as the direction of rotation of the rotor or in the opposite direction, the said device, of the so-called variable flow type being described hereunder in greater detail.

Turning to the subject of the regulation of power of the driving turbine under the best conditions of efficiency, it should be indicated that the reduction of efficiency under variable load becomes less on the one hand, as the variations in the operational efficiencies of the machines are themselves smaller and as, on the other hand, the variations of extreme temperatures of the thermodynamic cycle are smaller.

Next with regard to the efficiency of the turbines, it is known that, following the law of kinematic similarity, this efficiency is a function of the ratio between the absolute speed of expansion of the fluid at the output of the distributor and the mean circumferential speed of the rotating blade wheel. It is known, moreover, that the said absolute speed is proportional to the square root of the energy produced, while the speed of rotation of the rotor is a function, as far as the driving turbine is concerned, of the resistive torque on the shaft and, as far as the turbo-compressor is concerned, of the power absorbed by the compressor.

Finally as regards the efficiency of the compressor proper, the absorbed power of which is a direct function of the ratio of compression and of the flow and an inverse function of the efficiency, it is known that the variations of the said efficiency and of the speed of rotation can be appreciably reduced over a wide range of operation by varying the rotary circulation of the flux at the admission on each side of the optimum value for which the machines are usually adapted and which corresponds to the most commonly adopted running speed. For example, in the case of a variation of power in the ratio of 2 to 1, the efficiency of the compressor, which would have a maximum value of 0.82 for a power ratio of 1.5, would have a value of 0.8 in the case of the extreme power ratios of 2 and 1.

It is observed that, by means of suitable regulation of the circulation of the compressor, which is represented by a certain pressure-flow characteristic curve, the compression ratio and the flow can be made to vary at the same time and in the same direction, by the quantities necessary to obtain a substantial variation of power, for example in the ratio of 2 to 1 which is contemplated, by only causing the speed of rotation of the turbo-compressor to vary by a small value so that this method of regulation, which greatly assists in maintaining high efficiencies of the compressor, is also useful in maintaining a good efficiency of the turbine which drives the said compressor, due to the fact that on the one hand, since the variation of the resistive power is smaller by reason of the quasi-constant efficiency of the compressor, the absolute speed of the fluid in the turbine varies less and on the other hand, the variation of the circumferential speed of the turbine which is generally higher than the variation of the absolute speed of the fluid (which only varies proportionately to the square root of the power) becomes smaller in its turn when the circulation is regulated, the result being that the efficiency of the turbine itself varies very little in the range of the adjustment zone.

In any case, that is irrespective of the method of regulation of power adopted, the continuity of flow in the compressor and in the two turbines creates at every speed the need for a correlation between the pressure and the temperature for a given rate of flow corresponding to the power to be supplied.

Since the variation of the thermo-dynamic efficiency becomes smaller as the variation of the maximum temperature of the cycle is smaller, the variation of the temperature at the admission of the high-pressure turbine is restricted to the only condition required by the continuity factor and, as explained in the foregoing description, the temperature is regulated at the admission of the low-pressure turbine by means of a partial transfer of the heat of the gases into the compressed air, thus constituting a heat pump, which is conducive to a good efficiency.

Due to the combination of independent means of regulation of the temperatures in the two turbines together with the regulation of the rotary circulation of the flux sucked in by the compressor, the present invention thus makes it possible to obtain good conditions of efficiency over a wide range of variation of power.

If, as it has been assumed in FIG. 4, the quantitative regulation rod 118 of the injection pump 100 is actuated by the displacement of a rod 119 which engages the rod 118 by means of a connecting arm 120 returned by a spring 121, the degree of injection which is suitable for the operation at a given pressure is controlled by coupling the connecting arm 120 on the one hand to a thermostat 122 disposed at the admission of the turbine 4 by means of coupling members such as, for example, a rocking arm 123 and connecting rods 124 and 128 and, on the other hand, to a manostat which is sensitive to the delivery pressure of the compressor 3, this pressure being made to act, for example, on a piston 125 against the action of an opposing spring 126, the movements of the piston 125 being transmitted to a rocking cam 127 having a suitable profile, the connecting-rod 124 being applied by the spring 121 against the said profile.

The action carried out on the temperature at the admission of the low-pressure turbine is combined with the action applied to the temperature at the admission of the high-pressure turbine by combining the sliding action of the rod 129 operating the shutter 116 so as to co-operate with the perpendicular sliding action of the control-rod 119, on which is pivotally mounted the connecting arm 120 which in turn operates the rod 118 for the quantitative regulation of the injection. For this purpose and by way of example, a roller 131 which participates in the translation of the rod 119, the said rod being returned by an elastic means such as for example a spring 150, is caused to co-act with a profiled cam 130 which participates in the movement of translation of the sliding rod 129.

Finally, the means acting on the temperatures at the admission of the turbines are co-ordinated with the means acting on the flow at the intake of the compressor by proceeding in accordance with the description which follows or in like manner.

According to the present invention, the suction of the compressor 3 is provided with an annular channel 132 formed between a fixed axial hub 133 and a fixed cylinder 134, the said channel being divided into compartments by a plurality of partitions consisting of flexible blades 135, the front edges of which are secured at their inner ends in slots 136 of the hub 133 and at their outer ends in slots 137 of cylinder 134 so that these front edges are radial. The rear edges of these flexible blades 135 have their outer ends slidable in slots 139 formed in a cylindrical ring 140 inserted between the fixed casing of the compressor 3, and the fixed cylinder 134, but rotatable with respect to said casing and said cylinder about their common axis. The inner ends of said rear edges of flexible blades 135 are not fixed to hub 133 but are located in very close proximity thereto.

The ring 140 is in the form of a worm-wheel in mesh with a worm-screw 141 which is in turn driven in rotation by a crank 142. This crank is coupled to a lever 143 which is pivotally mounted on the control-rod 119, this latter being applied by the action of the spring 150 on to a pivotally mounted cam 151 which is in turn coupled to a piston 152, one of the faces of the said piston being subjected to the delivery pressure of the compressor 3.

It will be understood that translation of the rod 119 produces a rotation of the screw 141 and of the toothed ring 140 through the intermediary of the lever 143. This rotation is transmitted to the outer ends of the rear edges of the flexible blades 135 (slidable in the slots 139), thus twisting the said blades 135 since their front edges are fixed in position. These twisted blades thus form helicoidal partitions which guide the indrawn air towards the rotor, and give this air a variable positive or negative speed of rotation, thus modifying the rotary circulation at the inlet of compressor 3.

There was subsequently constituted a turbo-motor unit designed to operate with satisfactory efficiency and at variable power by means of the operation of a single member controlled either at will or by the action of an automatic regulator. When the said member is operated in the direction of the arrow, it increases the quantity of fuel on the one hand and thus increases the temperature at the admission of the high-pressure turbine, tending to accelerate the turbo-compressor, the pressure and delivery of which are increased, and tending at the same time to increase the temperature at the admission of the low-pressure turbine 1 by reducing the diversion of air towards the exchanger 16 due to the partial closure of the gate-valve 116 and, on the other hand, the control member modifies the circulation of the compressor by means of the combined control of the orientation of the flexible blades 135, in such manner that the said compressor operates according to the appropriate pressure-delivery characteristic.

If in the position of the control to which correspond the working pressure (therefore the position of the cam 127) and the position of the gate 116, the temperatures of admission to the turbine do not exactly correspond to their conditioning values compatible with the rate of flow and the pressure, the action of the thermostat 122, by displacing the connecting-rod 128 on the cam 127, corrects the temperatures by regulating the injection of fuel. Similarly, in a certain position of the control-rod 119 corresponding to pre-determined temperatures at the admission of the turbines 1 to 4, the delivery pressure of the compressor 3 ensures the appropriate correlation of the delivery of the said compressor 3 with the conditions of pressure and temperature by acting through the piston 152 on the cam 151 (therefore on the lever 143) and through the crank 142 and the screw 141 on the angular orientation of the ring 140 (therefore on the orientation of the blades 135).

What I claim is:

1. A power plant which comprises, in combination, a power turbine, at least one second turbine mechanically independent of said power turbine, gas conveying means leading from the outlet of said second turbine to the inlet of said power turbine, at least one non-volumetric rotary air compressor mechanically coupled with said second turbine, gas conveying means leading from the outlet of said compressor to the inlet of said second turbine, a fuel combustion chamber inserted in said last mentioned gas conveying means, fuel feed means opening into said combustion chamber, fuel feed control means for varying the rate of feed of fuel supplied by said fuel feed means, heat exchange means for transferring heat from gas flowing through said first mentioned gas conveying means to air flowing through said second mentioned gas conveying means, valve means for varying the amount of heat transferred through said heat exchange means, means for modifying the rotary circulation at the inlet of said compressor, and means, operative by variations of at least one factor of operation of said plant variable in response to the action of said fuel feed control means, for operating said valve means and said rotary circulation modifying means so that, in response to a reduction of the rate of fuel feed, said amount of heat is increased and said rotary circuation is modified to adjust the flow rate at the inlet of said compressor to the flow rate through said second turbine.

2. A power plant which comprises, in combination, a power turbine, at least one second turbine mechanically independent of said power turbine, gas conveying means leading from the outlet of said second turbine to the inlet of said power turbine, at least one non-volumetric rotary air compressor mechanically coupled with said second turbine, gas conveying means leading from the outlet of said compressor to the inlet of said second turbine, said last mentioned gas conveying means including a direct flow portion and a by-pass portion, a fuel combustion chamber inserted in said last mentioned gas conveying means, fuel feed means opening into said combustion chamber, fuel feed control means for varying the rate of feed of fuel supplied by said fuel feed means, heat exchange means interposed between said first mentioned gas conveying means and the by-pass portion of said second mentioned gas conveying means, valve means in said second mentioned gas conveying means for varying the amount of gas caused to pass through said by-pass portion thereof, means for modifying the rotary circulation at the inlet of said compressor, means, operative by variations of at least one factor of operation of said plant variable in response to the action of said fuel feed control means, for operating said valve means and said rotary circulation modifying means so that, in response to a reduction of the rate of fuel feed, the flow of gas through said by-pass portion is increased and said rotary circulation is modified to adjust the flow rate at the inlet of said compressor to the flow rate through said second turbine.

3. A power plant which comprises, in combination, a power turbine, a second turbine mechanically independent of said power turbine, a first air compressor mechanically coupled with said second turbine, a third turbine mechanically independent of said first and second mentioned turbines, a second air compressor mechanically coupled with said third turbine, air conveying means leading from the outlet of said first air compressor to the inlet of said second air compressor, an air cooling device mounted in said air conveying means, gas conveying means leading from the outlet of said second turbine to the inlet of said power turbine, gas conveying means leading from the outlet of said second compressor to the inlet of said third turbine, a fuel combustion chamber inserted in said last mentioned gas conveying means, fuel feed means opening into said combustion chamber, fuel feed control means for varying the rate of feed of fuel supplied by said fuel feed means, gas conveying means leading from the outlet of said third turbine to the inlet of said second turbine, heat exchange means for transferring heat from gas flowing through said third mentioned gas conveying means to air flowing through said second mentioned gas conveying means, valve means for varying the amount of heat transferred through said heat exchange means, means for varying the cooling action of said air cooling device, and means, operative by variations of at least one factor of operation of said plant variable in response to the action of said fuel feed control means, for operating said valve means and said cooling action varying means so that, in response to a reduction of the rate of fuel feed, said amount of heat is increased and the cooling action of said air cooling device is reduced.

4. A power plant which comprises, in combination, a power turbine, a second turbine mechanically independent of said power turbine, a first air compressor mechanically coupled with said second turbine, a third turbine mechanically independent of said first and second mentioned turbines, a second air compressor mechanically coupled with said third turbine, air conveying means leading from the outlet of said first air compressor to the inlet of said second air compressor, an air cooling device mounted in said air conveying means, gas conveying means leading from the outlet of said second turbine to the inlet of said power turbine, gas conveying means leading from the outlet of said second compressor to the inlet of said third turbine, a fuel combustion chamber inserted in said last mentioned gas conveying means, fuel feed means opening into said combustion chamber, gas conveying means leading from the outlet of said third turbine to the inlet of said second turbine, said last mentioned means including a direct flow portion and a by-pass portion, heat exchange means interposed between said second mentioned gas conveying means and the by-pass portion of said third mentioned gas conveying means, fuel feed control means for varying the rate of feed of fuel supplied by said fuel feed means, valve means in said third mentioned gas conveying means for varying the amount of gas caused to pass through said by-pass portion thereof, means for varying the cooling action of said air cooling device, and means, operative by variations of at least one factor of operation of said plant variable in response to the action of said fuel feed control means for operating said valve means and said cooling action varying means so that in response to a reduction of the rate of fuel feed the flow of gas through said by-pass portion is increased and the cooling action of said air cooling device is reduced.

References Cited in the file of this patent

UNITED STATES PATENTS

| | | |
|---|---|---|
| 2,547,093 | Ray | Apr. 3, 1951 |
| 2,627,717 | Waller | Feb. 10, 1953 |
| 2,654,217 | Rettaliata | Oct. 6, 1953 |
| 2,895,294 | Terrell | July 21, 1959 |

FOREIGN PATENTS

| | | |
|---|---|---|
| 999,133 | France | Oct. 3, 1951 |
| 651,319 | Great Britain | Mar. 14, 1951 |
| 760,415 | Great Britain | Oct. 31, 1956 |
| 249,720 | Switzerland | May 1, 1948 |